United States Patent
Haringer

(10) Patent No.: US 7,373,999 B2
(45) Date of Patent: May 20, 2008

(54) CRAWLER-TRACKED VEHICLE WITH VARIABLE TRACK WIDTH

(75) Inventor: Alois Johann Haringer, Neumarkt (IT)

(73) Assignee: macmoter S.p.A., Modigliana (IT)

( * ) Notice: Subject to any disclaimer, the term of this patent is extended or adjusted under 35 U.S.C. 154(b) by 366 days.

(21) Appl. No.: 10/825,079

(22) Filed: Apr. 14, 2004

(65) Prior Publication Data

US 2004/0239092 A1   Dec. 2, 2004

(30) Foreign Application Priority Data

Apr. 14, 2003   (DE) ............................... 103 17 309

(51) Int. Cl.
*B62D 55/00*   (2006.01)
(52) U.S. Cl. .................................... 180/9.48
(58) Field of Classification Search ............... 180/9.48, 180/9.52, 9
See application file for complete search history.

(56) References Cited

U.S. PATENT DOCUMENTS

| | | | |
|---|---|---|---|
| 3,700,115 A | * | 10/1972 | Johnson et al. ............. 212/301 |
| 3,998,286 A | | 12/1976 | Ponikelsky et al. |
| 4,341,276 A | | 7/1982 | Furuichi |
| 5,368,115 A | | 11/1994 | Crabb |
| 6,394,204 B1 | | 5/2002 | Haringer |
| 2001/0025732 A1 | | 10/2001 | Lykken et al. |

FOREIGN PATENT DOCUMENTS

| | | | |
|---|---|---|---|
| DE | 198 57 891 | | 6/2000 |
| FR | 2416825 A | * | 10/1979 |
| WO | WO 98/40264 | | 9/1998 |

* cited by examiner

*Primary Examiner*—Faye M. Fleming
(74) *Attorney, Agent, or Firm*—W. F. Fasse; W. G. Fasse

(57) ABSTRACT

A crawler-tracked vehicle with a variable track width can be used as a construction vehicle and/or as a vehicle for agricultural purposes. The vehicle includes an undervehicle with a vehicle frame, on which is provided on each of the two sides a chassis with a chassis carrier respectively for carrying at least one driving wheel and one deflecting wheel and supporting wheels for the guidance of crawler tracks. At least one of the two chassis carriers (10, 11) can be fastened releasably to the vehicle frame (7) at a different distance transversely to the undervehicle (6) with carrying elements (24, 25) arranged laterally at the front and rear and with receiving and supporting elements (26, 27) and with holding and releasing elements (28).

19 Claims, 15 Drawing Sheets

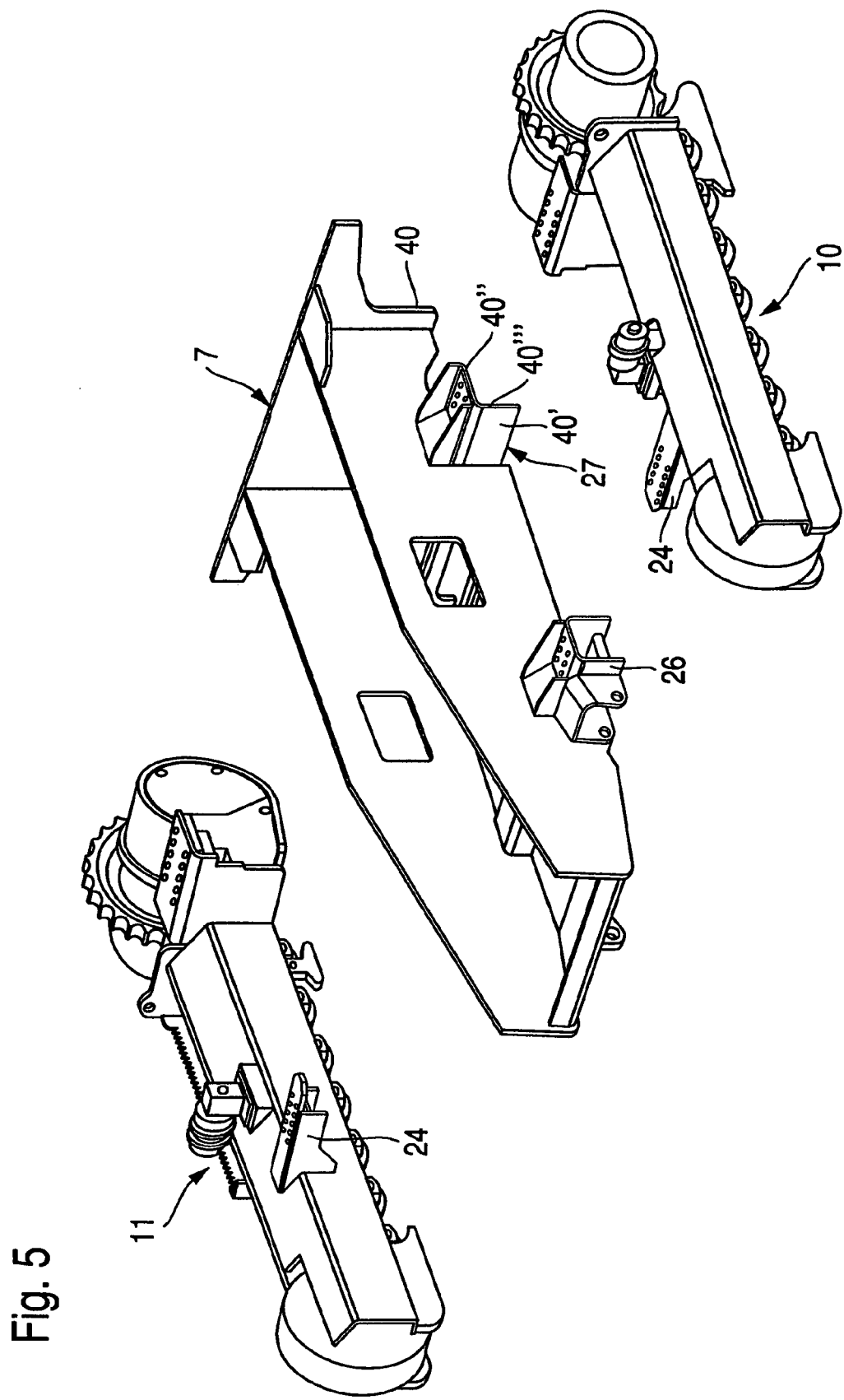

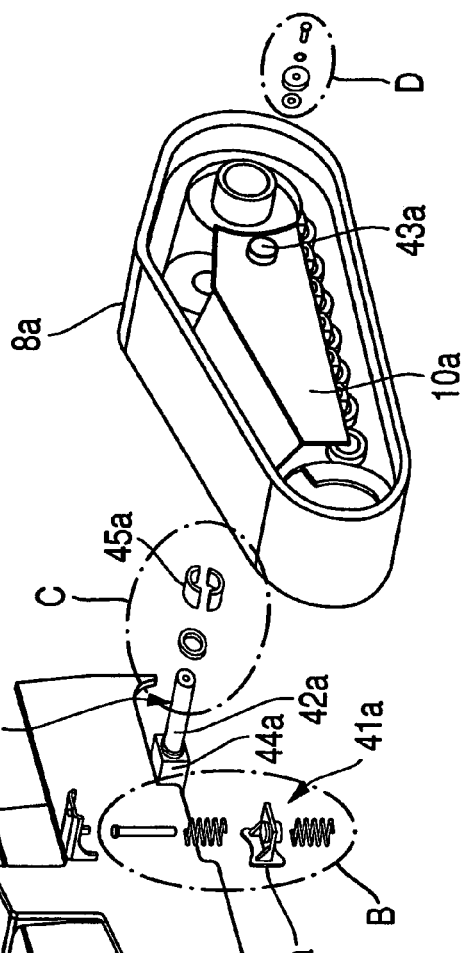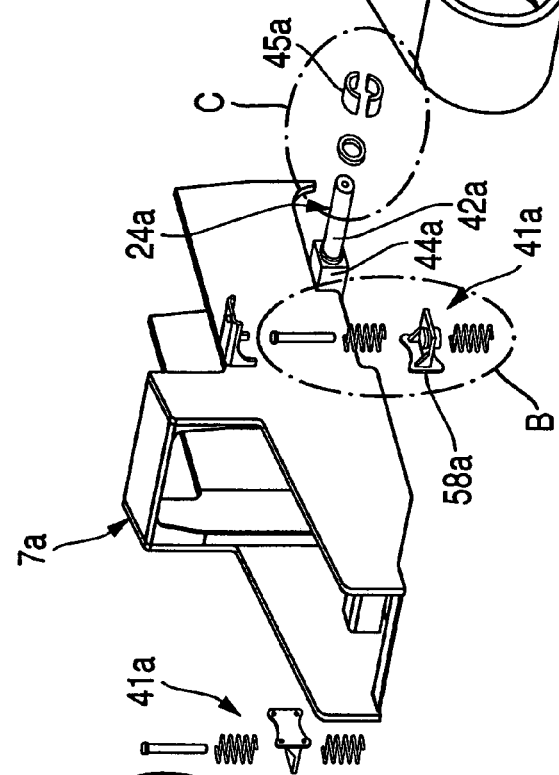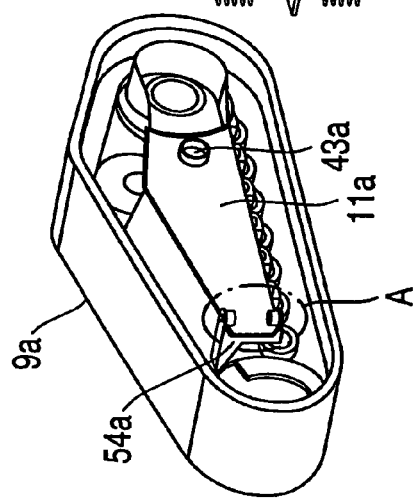

100

CRAWLER-TRACKED VEHICLE WITH VARIABLE TRACK WIDTH

FIELD OF THE INVENTION

The invention relates to a crawler-tracked vehicle with variable track width, which can be used, in particular, as a construction vehicle and/or as a vehicle for agricultural purposes.

BACKGROUND INFORMATION

Crawler-tracked vehicles of this type with variable track width are basically known. However, they do not satisfactorily fulfill the expectations placed on them, since the technical outlay is high and the costs associated with this often do not justify the advantages which are basically present and which are associated with the possibility of varying the track width.

SUMMARY OF THE INVENTION

The object on which the invention is based is, therefore, to provide measures, with the aid of which it is possible in a technically simple way and cost-effectively to provide a crawler-tracked vehicle with variable track width.

To achieve this object, the invention provides that at least one of the two chassis carriers can be fastened releasably to the vehicle frame at a different distance transversely to the undervehicle with the aid of holding and releasing means and with the aid of carrying and also receiving and supporting means arranged laterally at the front and rear.

The holding and releasing means are preferably bores or passage orifices and screws and/or threaded bolts serving for fastening, if appropriate with assigned nuts. As carrying and also receiving and supporting means, on the one hand, carrying arms and, on the other hand, receiving parts receiving these and, as a rule, surrounding these largely or partially positively are arranged on the vehicle frame and/or on the chassis carrier and are oriented in alignment with one another. The carrying arms may be at least partially U-shaped and/or L-shaped in cross section and be arranged at their fastening point in each case with a cross section opened upward and/or downward and/or rearward. The supporting and receiving parts, too, preferably have a U-shaped and/or L-shaped cross section.

Consequently, according to the exemplary embodiment, a crawler-tracked vehicle consisting only of an overvehicle and an undervehicle can easily be placed onto carrying arms arranged, for example, on the chassis carrier and projecting freely from the latter. Furthermore, both the right and the left chassis, together with each chassis carrier, can be positioned along the carrying arms transversely to the vehicle frame and be fastened at a desired distance from the vehicle frame and chassis carrier with the aid of threaded bolts or screws and nuts.

The production of said parts and also the fixing and release of the chassis carriers to and from the vehicle frame and renewed connection in another position are therefore extremely simple.

In a development of the invention, there is provision that each chassis carrier also serves at the same time as a carrier for a hydraulic and/or an electric drive. This means that the vehicle drive comprises at least one main motor, and that respective drives for the movement of the crawler tracks may be arranged directly on the chassis carrier itself. Correspondingly, a pump or generator is driven by the main motor, in order to make energy available for the drives arranged on the chassis carriers.

The individual drives, too, vary their position correspondingly in the event of a variation in the track width. The individual drives are preferably hydraulic motors and/or electric motors and act, for example, only on rear driving wheels. However, the invention is not restricted to this. Front and rear driving wheels, with respective integrated hydraulic or electric motors, may also be provided.

The supply of energy to the hydraulic and/or electric drives is uncomplicated, since it can easily be adapted to a varied track width with the aid of hoses and/or with the aid of electrical lines.

Insofar as, according to a preferred exemplary embodiment, the track width is to be adjustable in the region of a carrying axle, such as, for example, in the region of a pivot axle for the chassis carrier, a changeover spacer bush may be provided. Finally, when a spacer bush is used for each axle, the work to be carried out during the variation in the track width is minimal when, according to a preferred exemplary embodiment, the spacer bush consists of half shells.

In principle, in a development of the invention, a height adjustment between the vehicle frame and the chassis carriers may also be carried out.

Further features of the invention may be gathered from subclaims and from the description in conjunction with the drawing.

BRIEF DESCRIPTION OF THE DRAWINGS

The invention is described in more detail below with reference to exemplary embodiments illustrated in the drawing in which:

FIG. 5 shows a perspective and exploded view of the vehicle frame and of the two chassis carriers on a smaller scale in a modified exemplary embodiment and in a partially more clearly understandable illustration;

FIG. 6 shows a perspective of the right chassis of a further exemplary embodiment on an even smaller scale;

FIG. 7 shows a perspective view of the vehicle frame belonging to the chassis illustrated in FIG. 6;

FIG. 8 shows a perspective view of the left chassis, in the case of forward travel, for the vehicle frame according to FIG. 7;

DETAILED DESCRIPTION OF EXAMPLE EMBODIMENTS OF THE INVENTION

Figure 1:
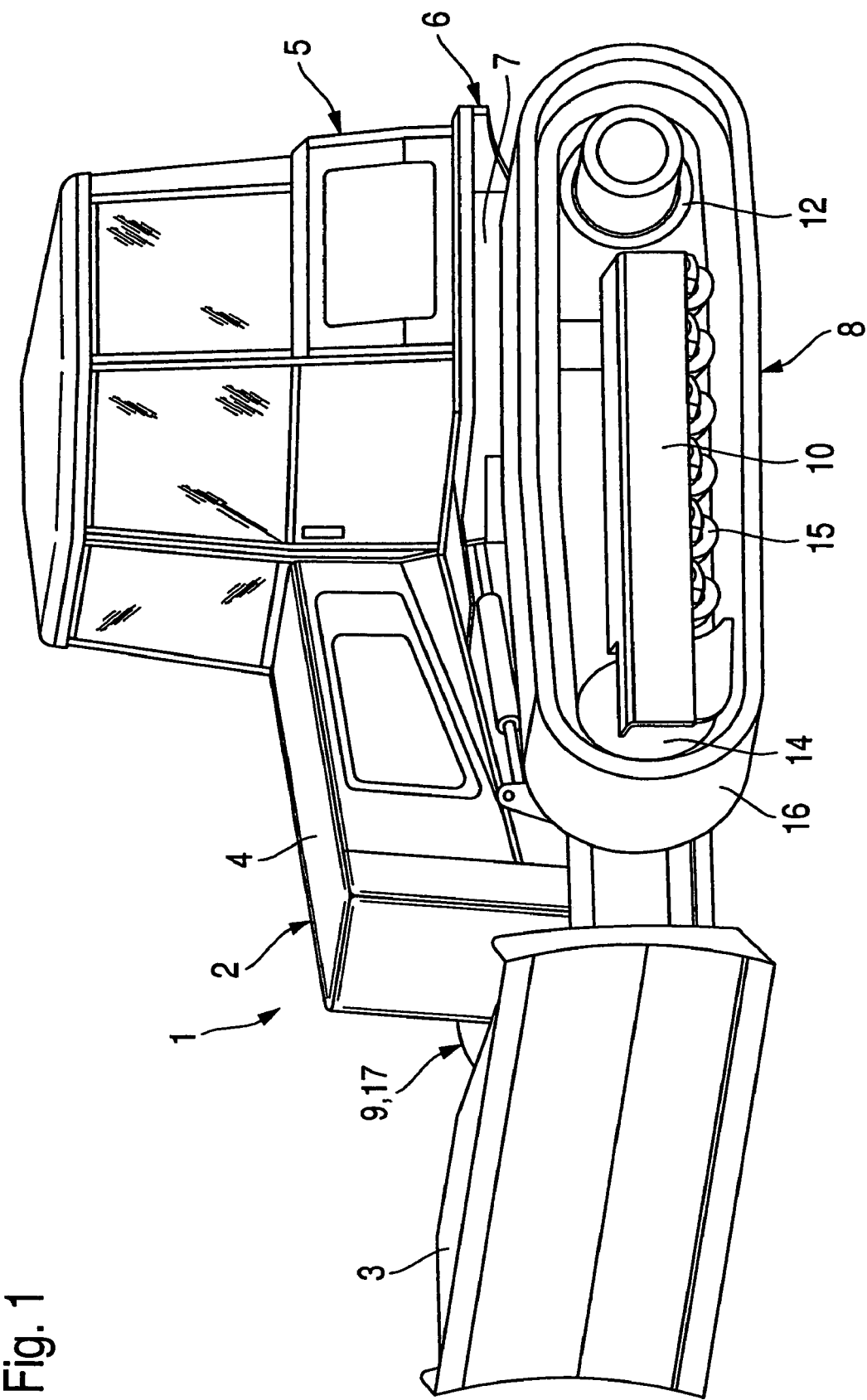
FIG. 1 shows a perspective illustration of a crawler-tracked vehicle with variable track width in the form of a construction vehicle.

An agricultural vehicle, not illustrated in the figures, which has chain tracks or crawler tracks, such as, for example, a traction machine or tractor and, likewise, a crawler-tracked vehicle 1 serving as a construction vehicle 2 according to the illustration in FIG. 1 are in each case equipped with the necessary means for varying the track width and are identical in this respect, even when the necessary means are described below only with reference to the construction vehicle 2 according to FIG. 1. The illustrations in all the figures therefore apply equally to agricultural vehicles and to construction vehicles.

According to FIG. 1, the crawler-tracked vehicle 1, as a construction vehicle 2, has a tool 3, for example in the form of a dozer blade or the like, and comprises, furthermore, a vehicle motor 4 and further components of an overvehicle 5 and of an undervehicle 6. An essential part of the undervehicle 6 is a trough-shaped vehicle frame 7, on which are provided, on each of the two sides, a chassis 8 and 9, in each case with a chassis carrier 10, 11 for respectively at least one driving wheel 12, 13, for deflecting wheels 14 and for supporting wheels 15 for the guidance of crawler tracks 16 and 17. The driving wheels 12, 13 are gearwheels.

Figure 2:
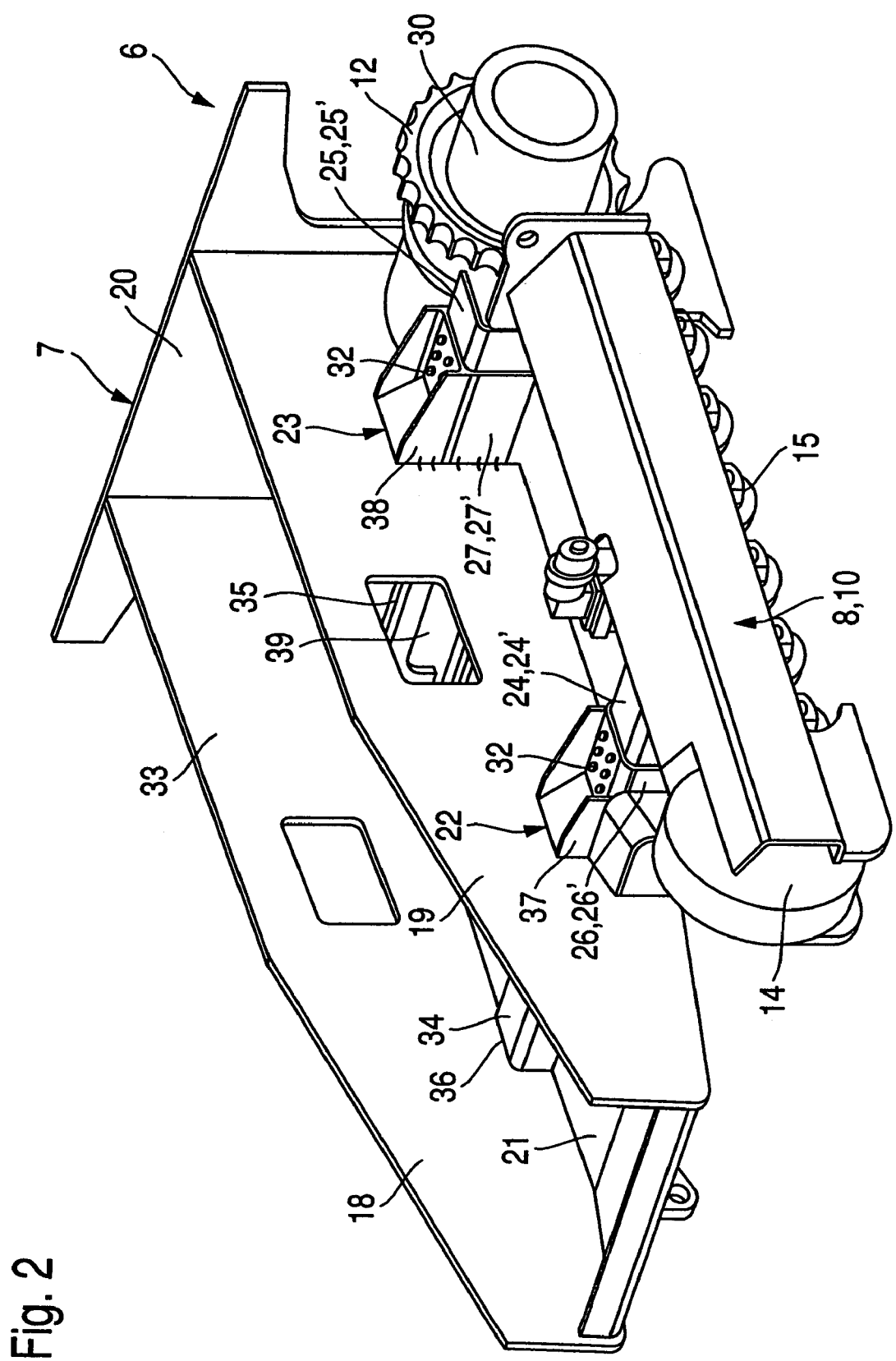
FIG. 2 shows a perspective view of essential parts of the undervehicle with a chassis carrier fastened to the vehicle frame.

According to the illustration in FIG. 2, the vehicle frame 7 comprises a right side wall 18 and a left side wall 19 and also a rear wall 20 connecting these two side walls 18 and 19 on the rear side and a bottom 21.

In the exemplary embodiments illustrated in the figures, the two chassis carriers 10, 11 can be connected releasably to the vehicle frame 7 together with their respective components for varying the track width.

For fastening the chassis carriers 10, 11 to the vehicle frame 7, these have, on sides facing one another, in each case fastening points 22 and 23 arranged at a distance from one another. In the exemplary embodiment illustrated in FIG. 2, these fastening points 22, 23 are formed with the aid of carrying arms 24' and 24" or 25' and 25" serving as carrying means 24, 25, on the one hand, and of receiving parts 26', 26" and 27', 27" serving as receiving and supporting means 26, 27, on the other hand, which in each case are arranged in alignment on the chassis carriers 10, 11 and on the vehicle frame 7.

The front carrying arm 24', 24" of each chassis carrier 10, 11 is U-shaped in cross section and has a carrying plate 28' and 28" between side parts. Each freely projecting carrying arm 24' or 24" is expediently welded to the chassis carrier 10, 11.

The other or rear carrying arm 25', 25" may likewise be U-shaped in cross section. Expediently, however, it is L-shaped in cross section.

The receiving parts 26', 26" and 27', 27" are likewise U-shaped and/or L-shaped in cross section.

In principle, the carrying arms 24', 24" and 25', 25" and also the receiving parts may in each case be hollow profiles, since at least the rear carrying arms 25', 25" located near the driving wheels 12, 13 preferably have a passage orifice 29 (FIG. 3) for lines, not illustrated, for the supply of energy to drives 30 or 31 which are arranged on the chassis carriers 10, 11.

All the carrying arms 24', 24" and 25', 25" are either arranged so as to project freely laterally from the chassis carriers 10, 11 or project at least laterally. They can be inserted telescopically selectively to a differing extent, according to the desired position, into the likewise laterally projecting receiving parts 26', 26" and 27', 27" serving as receiving and supporting means 26, 27 and arranged on the vehicle frame 7 and can be fixed releasably there with the aid of holding and releasing means 32 in the form of bores, passage orifices, threaded bores, threaded bolts or screws and, if appropriate, nuts.

According to the exemplary embodiment, the receiving parts 26', 26" and 27', 27" projecting freely in each case may be one piece and, for this purpose, extend through the side walls 18, 19 into the interior 33 of the vehicle frame 7. In its interior 33, they may be connected to one another or may consist of a one-piece profile part 34 or 35, said profile part extending in each case with free ends through orifices 36 (FIG. 2) in the side walls 18, 19 to form the receiving parts. In addition, brackets 37, 38 may be provided, in order to increase the load-bearing capacity of the receiving parts 26' to 27".

While the profile part 38 (FIG. 2) is U-shaped in cross section, this basically also applies to the profile part 35. Only its free ends serving as receiving parts 27', 27" are, if appropriate, L-shaped in cross section. Moreover, the profile part 35 has an orifice 39 in the interior 33 of the vehicle frame 7. Through this orifice are led the energy supply lines which, in the case of hydraulic drives 30, 31, effect the necessary supply of energy to pumps which, in turn, are driven by the vehicle motor 4 as the main motor.

Figure 3:
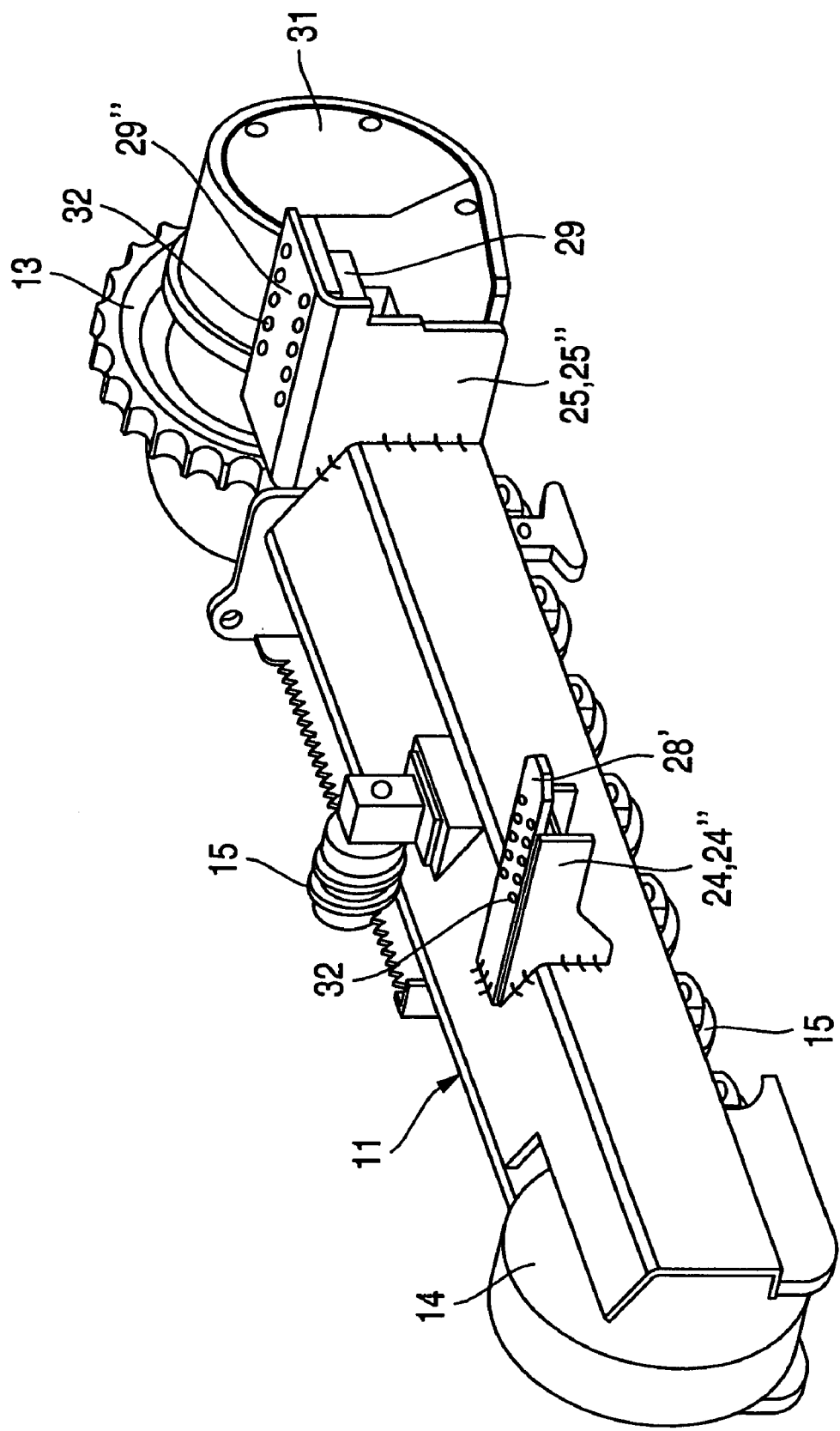
FIG. 3 shows, likewise in a perspective view and on a somewhat larger scale, an illustration of the second chassis carrier with its hydraulic drive.
Figure 4:
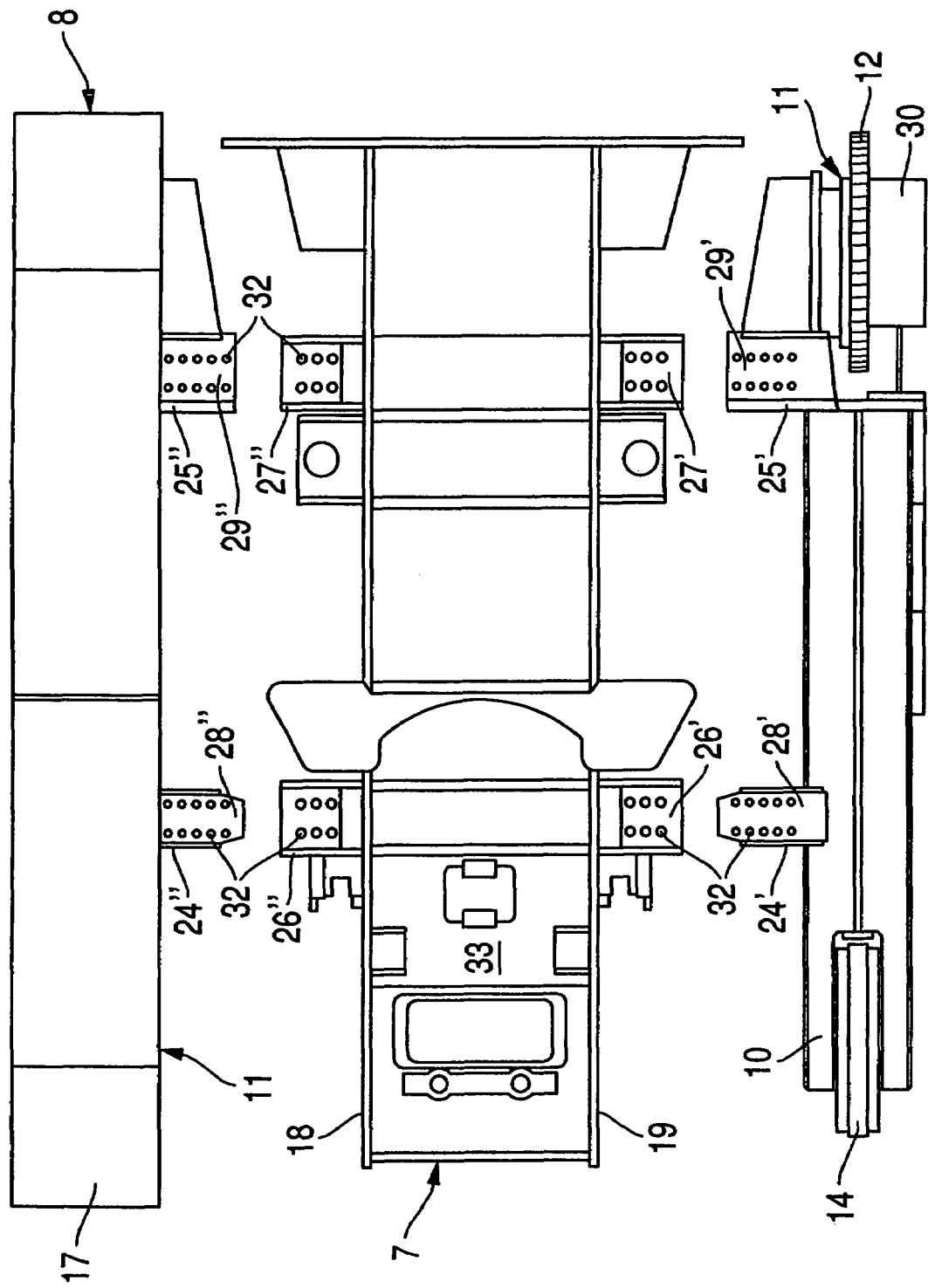
FIG. 4 shows, on yet another scale, a top view of essential parts of the vehicle frame and of the right chassis released from the latter and of the likewise released left chassis carrier with the drive located there.
Figure 9:
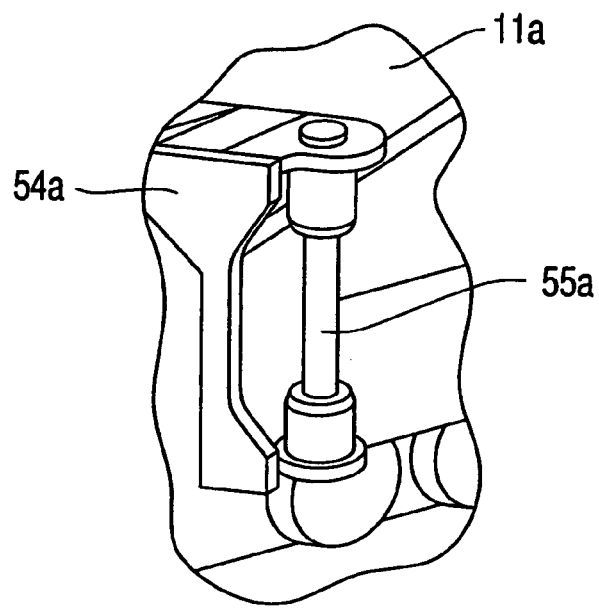
FIG. 9 shows the detail A in FIG. 6 on a larger scale.

The perspective illustrations of the vehicle frame 7 and of the two chassis carriers 10, 11 in FIG. 5 make it possible to see some details more clearly than the illustrations in FIGS. 2 and 3. Thus, the part serving directly as receiving and supporting means 27 is angular in cross section and at the same time is open downward and in the direction of the rear end 40 of the vehicle frame 7. Said part consists of a vertically standing leg 40' and of a further leg 40" which extends from the upper end 40''' of the first leg 40' horizontally in a direction toward the rear end 40 of the vehicle frame 7.

The variation in track width can therefore be carried out very easily with sufficient play even when the front receiving and supporting means 26 on the vehicle frame 7 receive the associated carrying means 24 on the chassis carriers 10, 11 positively or virtually positively. Nevertheless, because of the L-shaped configuration of the receiving and supporting means 27, the chassis carriers 10, 11 are capable of transmitting the forces occurring completely to the vehicle frame 7 in the forward direction of travel.

FIGS. 6 to 8 show a right and a left chassis 8a and 9a and a vehicle frame 7a of a modified exemplary embodiment, identical parts having basically the same reference numerals as the first exemplary embodiment and, in addition, the letter suffix a.

The fastening and mounting of the two chassis 8a and 9a on the vehicle frame 7a take place in each case pivotably in its rear region and with the aid of spring devices 41a in the front region. For the pivotable mounting, a carrying arm or an axle 42a (pivot axle) of round cross section is provided as carrying means 24a on each vehicle side. In the assembled state, they lie in each case in a corresponding bore 43a in each of the two chassis carriers 10a and 11a.

The axles 42a are fastened rigidly to the vehicle frame 7a with the aid of an intermediate piece 44a having, for example, a rectangular cross section.

Furthermore, a spacer bush 45a serves in each case for arranging the chassis carriers 10a and 11a on the axles 42a exactly in position, pivotably in relation to the vehicle frame 7a and, in particular, so as to allow a change in the track width. According to the exemplary embodiment illustrated in FIGS. 7 and 11, the spacer bush 45a consists of two half shells 46a and 47a. They can therefore be placed onto the axle 42a or removed from the latter, without the entire chassis 8a or 9a having to be drawn off completely from the axle 42a for this purpose.

Figure 11:
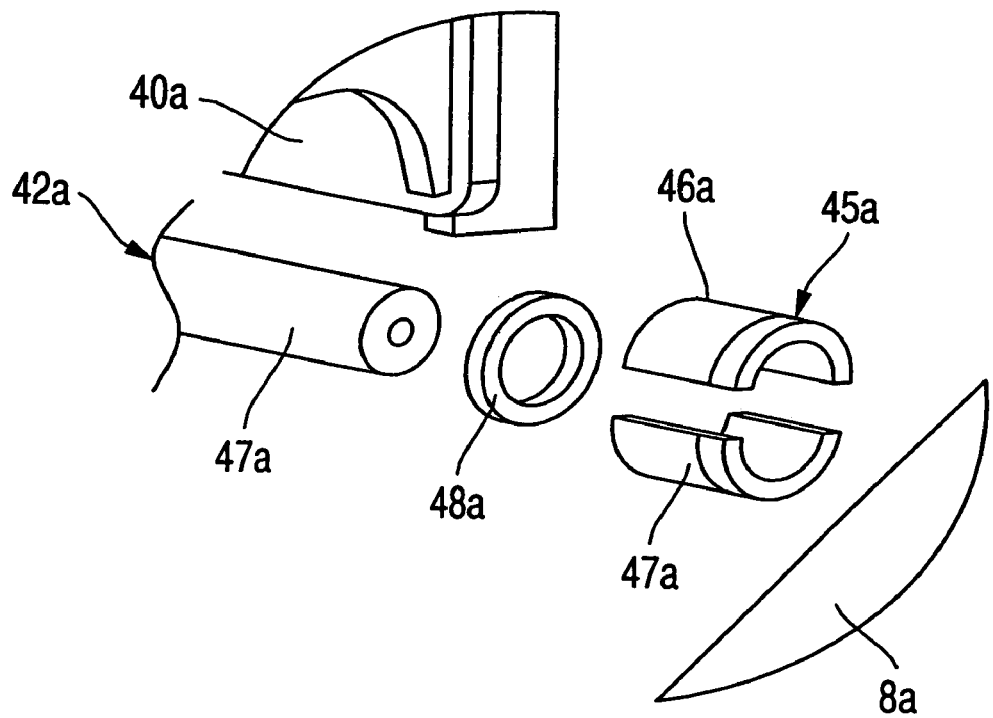
FIG. 11 shows the detail C in FIG. 7 on a larger scale.

In the assembled state, the spacer bush 45a is arranged on the axle 42a either on the frame side (large track width) or in the region of the outer end 47a of the axle 42a to achieve a small track width (FIG. 11). Two different positions for the track width are thereby obtained for the position of the chassis 8a or 9a.

Furthermore, for the spacer bush 45a to be arranged properly on the axle 42a, a closed inner ring 48a according to the exemplary embodiment illustrated in the figures is also provided.

Figure 12:
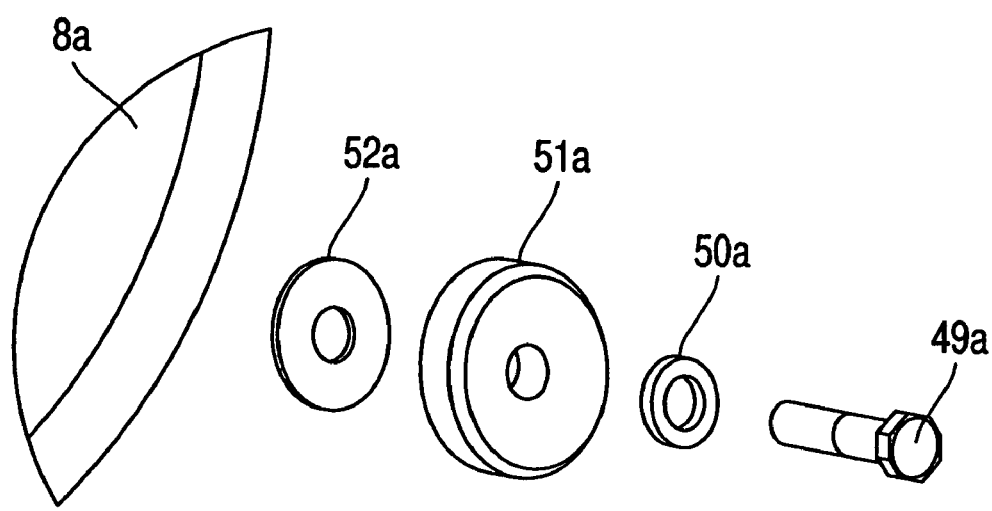
FIG. 12 shows the detail D in FIG. 8 on a larger scale.

Irrespective of whether the spacer bush 45a serving directly for the variation in track width of the rear end of the vehicle is located on the inside or on the outside on the axle 42a, a fastening screw 49a (FIG. 12) and also a small shim 50a, a large annular pressure piece 51a and a further annular washer 52a, serve for fastening the chassis 8a or the chassis 9a, in each case according to the detail D in FIG. 8.

According to FIG. 6, the spring device 41a provided on each of the two sides at the front end 53a of the vehicle frame 7a comprises, on the chassis side, a bracket 54a, on which a holding rod 55a is arranged in each case at its two ends.

The holding rod 55a serves for fixing two helical springs 56a and 57a exactly in position. In the assembled state, the holding rod 55a passes through the two springs 56a and 57a and, furthermore, a carrying and guiding bracket 58a which has a guide sleeve 59a for the holding rod 55a.

In the assembled state, the two springs 56a and 57a bear with their ends 60a and 61a facing away from one another against legs 62a and 63a of the bracket 54a.

Figure 10:
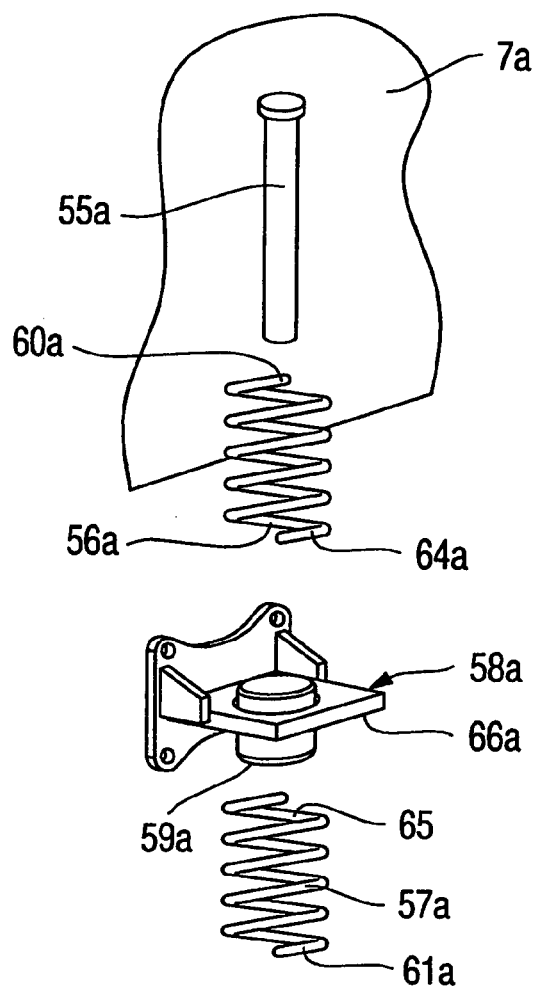
FIG. 10 shows the detail B in FIG. 7 on a larger scale.
Figure 21:
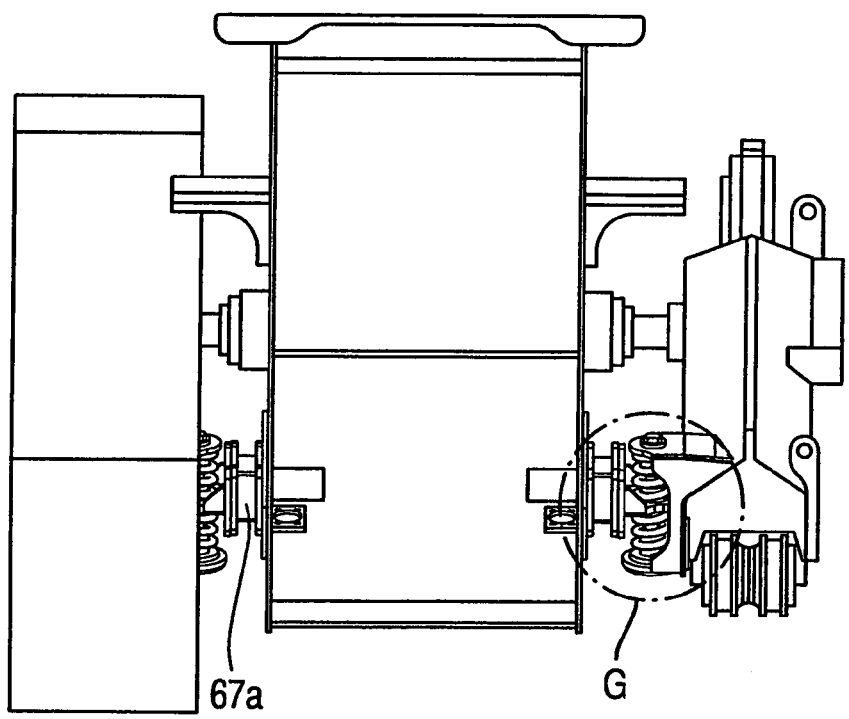
FIG. 21 shows, partially in section, a view of the vehicle frame from the front, with a chassis and with parts of a chassis carrier having a spring device arranged at the front end of the latter, including a spacer piece provided there.

In the assembled state, the two ends 64a and 65a, facing one another, of the two springs 56a and 57a bear against a holding plate 66a of the carrying and guiding bracket 58a, in which the guide sleeve 59a is located (FIG. 10 or FIG. 21).

Figure 13:
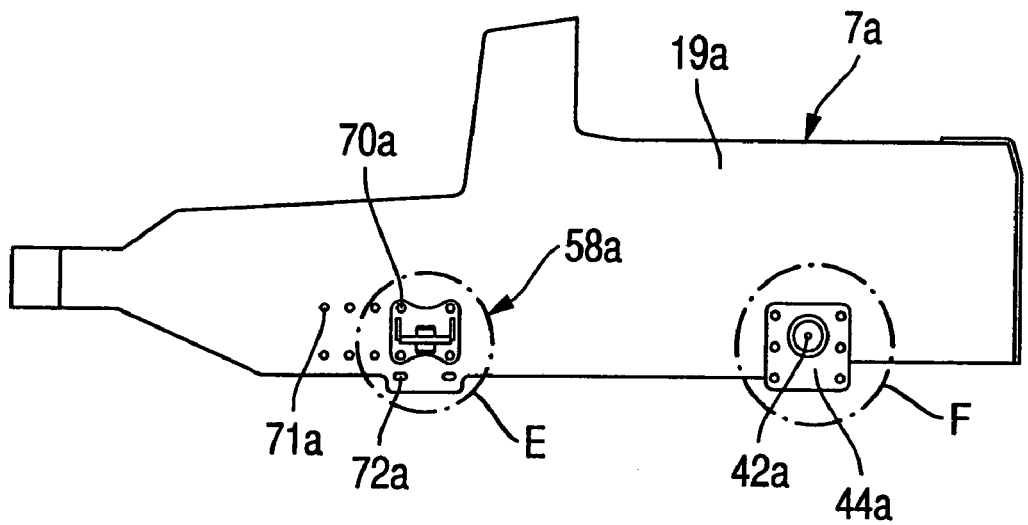
FIG. 13 shows a side view of the vehicle frame according to a further exemplary embodiment, with axles serving as carrying arms or pivot axles.
Figure 14:
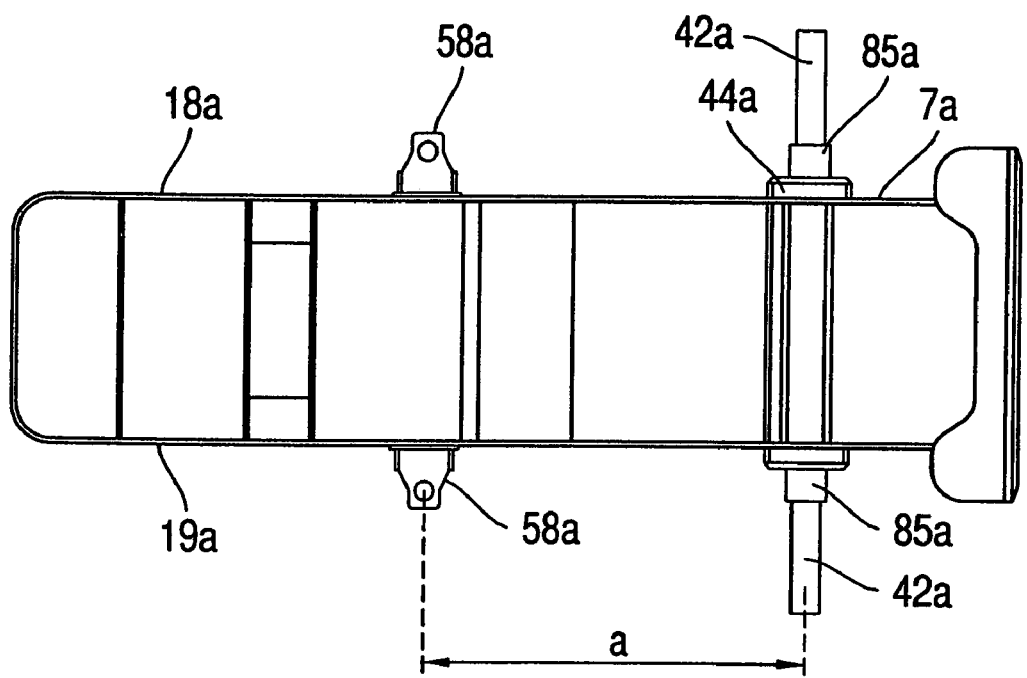
FIG. 14 shows a top view of the vehicle frame according to FIG. 13.

The carrying and guiding brackets 58a are basically fastened or screwed on the outside to the vehicle frame 7a or on the frame side (FIG. 7 or 13 and 14).

Figure 22:
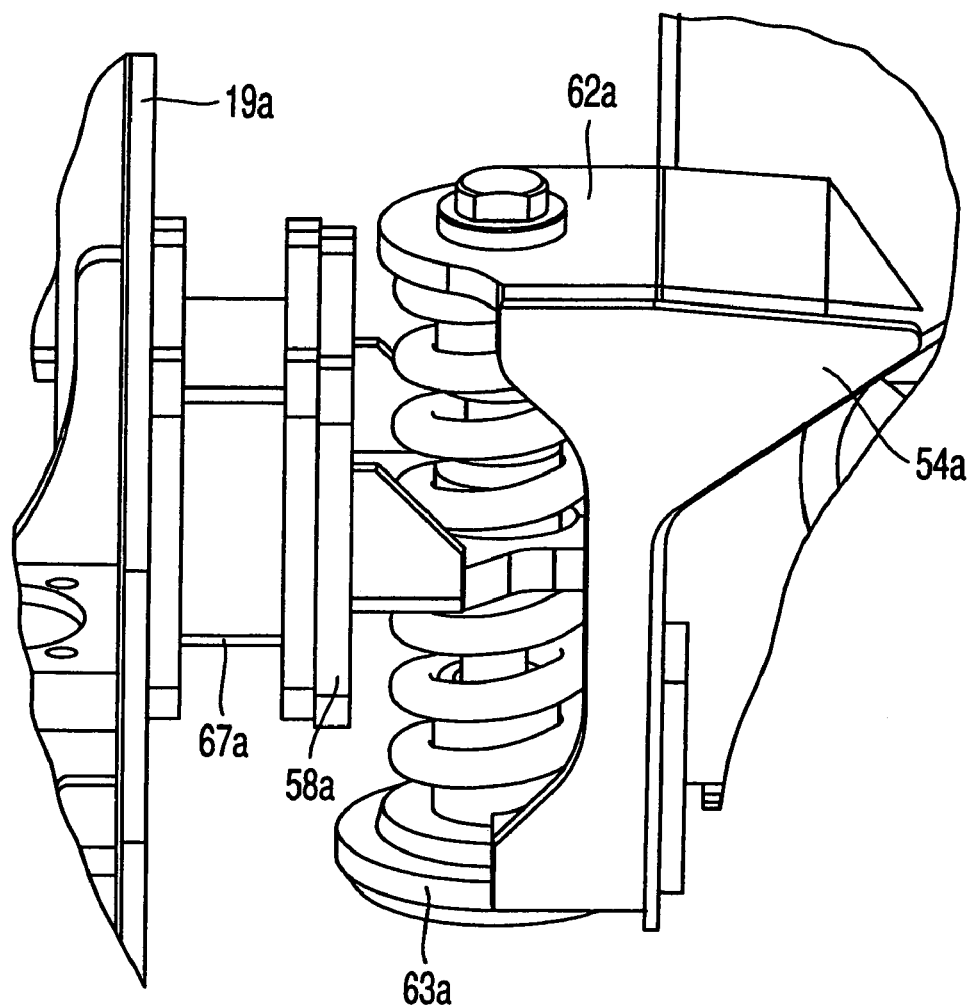
FIG. 22 shows the detail G in FIG. 21 on a larger scale.
Figure 23:
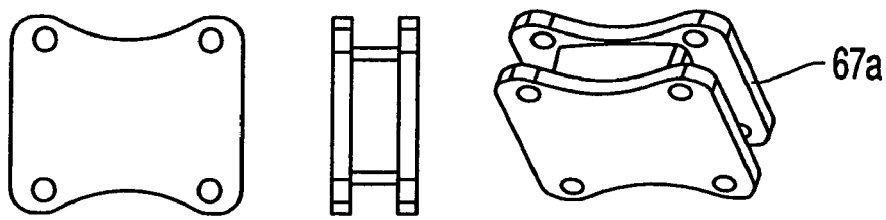
FIG. 23 shows three different views of the spacer piece on a smaller scale from the detail G according to FIGS. 21 and 22.

This may take place directly on the side walls 18a and 19a of the vehicle frame 7 or with the additional use of a spacer piece 67a (FIG. 22 or 23).

According to the exemplary embodiment, the spacer piece 67a is H-shaped in cross section and, in a one-piece design, consists of a centrally arranged block and of two plates arranged in alignment on the latter and having fastening orifices.

Figure 25:
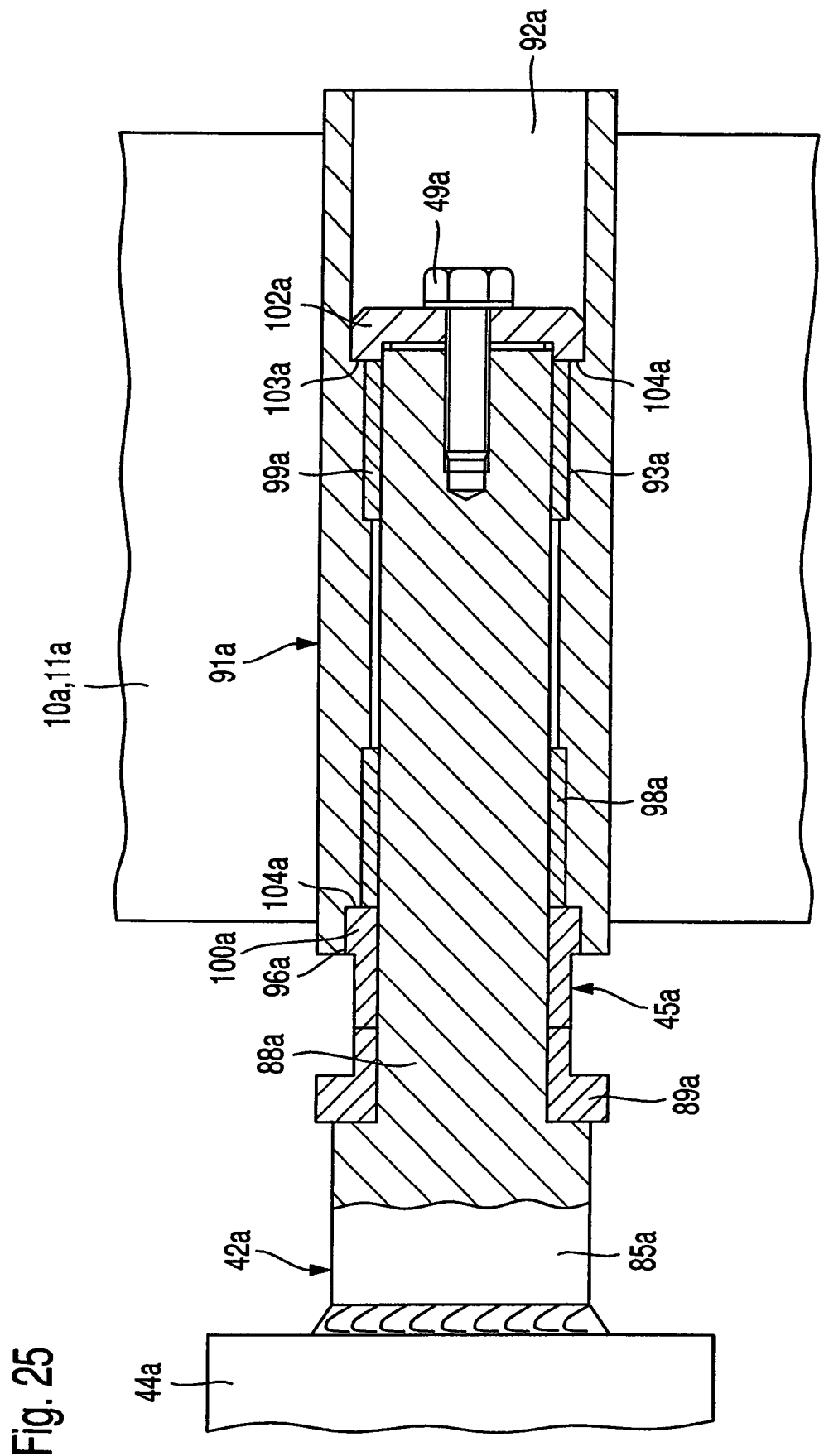
FIG. 25 shows a sectional view, as in FIG. 24, with the position of the spacer bush in the case of a large track width.

When the spacer sleeves 45a are located in each case near the side walls 18a and 19a of the vehicle frame 7a, as is illustrated in FIG. 25, it goes without saying that the carrying and guiding brackets 58a must be fastened on the outside to the side walls 18a and 19a of the vehicle frame 7a, using spacer pieces 67a. This may be gathered accordingly from FIGS. 21 and 22.

Furthermore, FIGS. 13 to 20 show various fastening possibilities for the axles 42a and for the carrying and guiding brackets 58a in each case on the side walls 18a and 19a of the vehicle frame 7a. According to the exemplary embodiment illustrated in the figures, the carrying and guiding bracket 58a has a sufficient number of bores 70a for fastening screws. Corresponding bores 71a, which may be simple bores or long holes, are located in the side walls 18a and 19a. In actual fact, bores 71a of this type are provided in a larger number, in such a way that the carrying and guiding brackets 58a can not only be fastened at a single predefined point on the vehicle frame 7a, but also at a plurality of points at a different distance from the axle 42a and at a different height level.

So that the carrying and guiding brackets 58a can be fastened to the vehicle frame 7a at a different height level, further additional bores 72a or long holes to the first position illustrated in FIG. 13 are arranged below the bores 71a provided for the first fastening (FIG. 13). The carrying and guiding brackets 58a can therefore be shifted directly from a higher fastening point to a lower point on the vehicle frame 7a and vice versa.

The two side walls 18a and 19a therefore have substantially more bores 71a or long holes 71a than would be necessary for a single exactly positioned fastening of the carrying and guiding brackets 58a.

As already illustrated with regard to the embodiment of FIG. 7, the axle 42a is located on an intermediate piece 44a. This intermediate piece 44a may have a square cross section or else, according to the intermediate pieces 44a illustrated in FIGS. 13 and 15 or 20, be rectangular in cross section so as to deviate from the square shape. In this case, the respective axle 42a is located on the intermediate piece 44a in an eccentrically fastened position.

Figure 15:
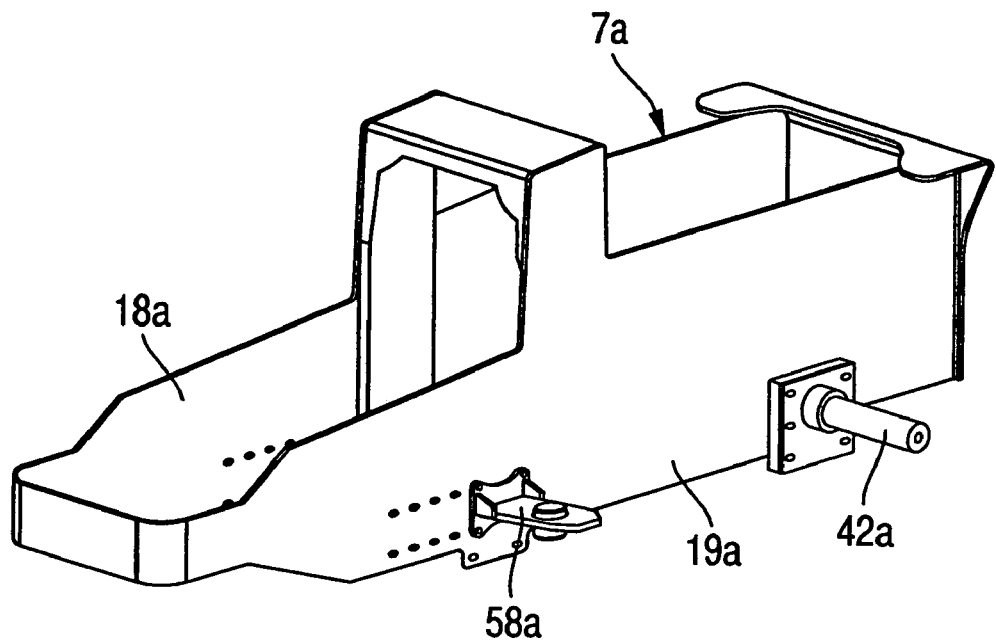
FIG. 15 shows a perspective view of the vehicle frame according to FIGS. 13 and 14 from the left.
Figure 16:
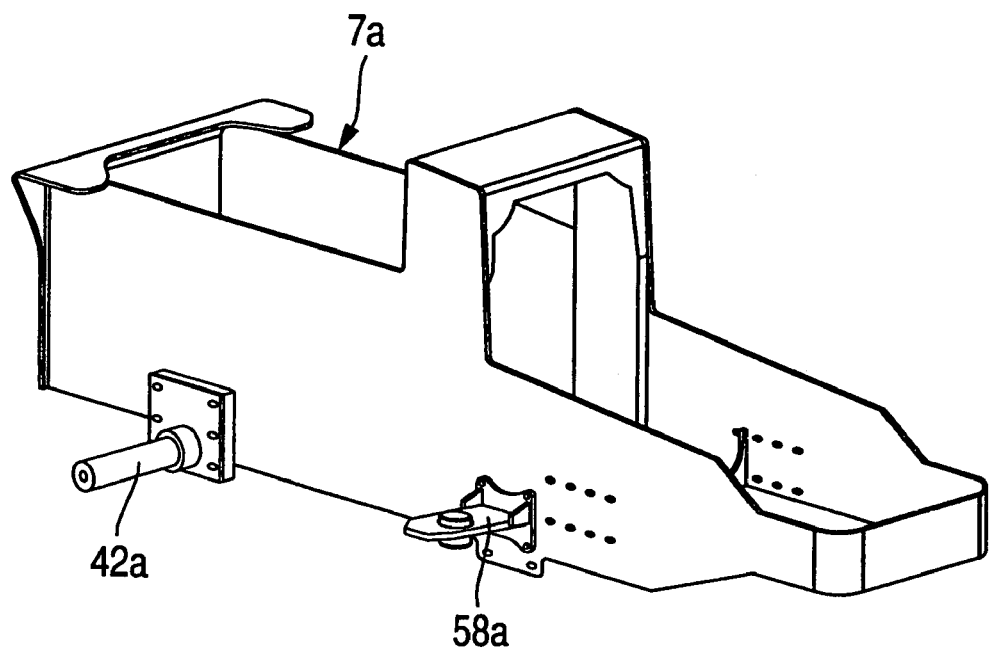
FIG. 16 shows a perspective view, as in FIG. 15, from the right, with a height setting for the chassis carriers which is changed with respect to the illustration in FIG. 15.
Figure 17:
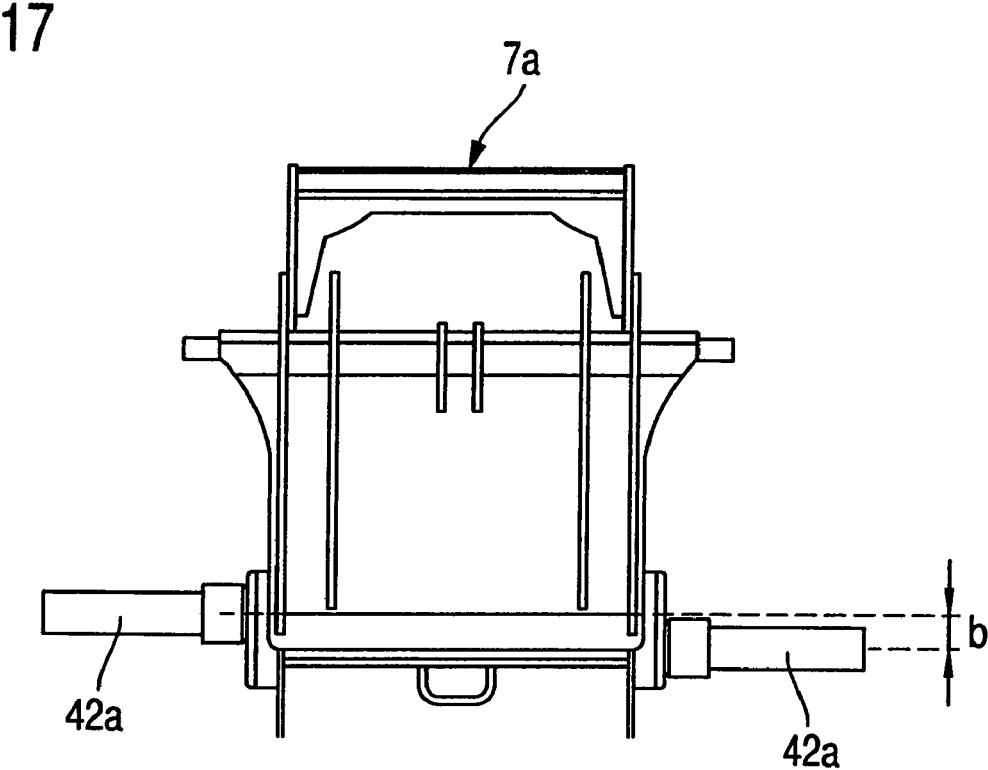
FIG. 17 shows a view of the vehicle frame according to FIGS. 13 to 16, with axles arranged at different heights to illustrate the variation possibilities and serving as carrying arms.
Figure 18:
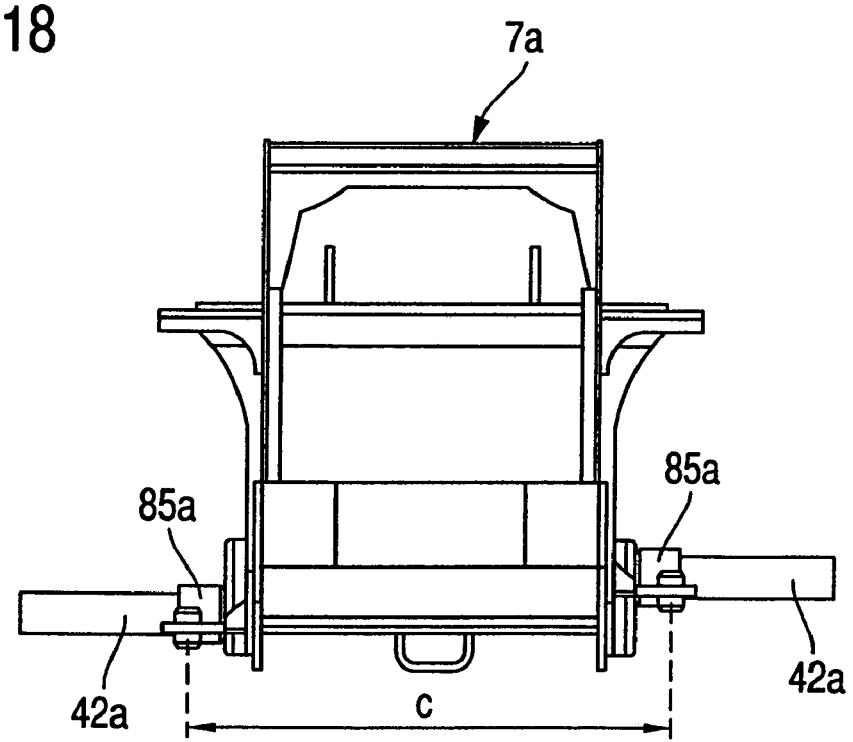
FIG. 18 shows a view, as in FIG. 17, of the vehicle frame from the front, with axles likewise arranged at different heights.
Figure 19:
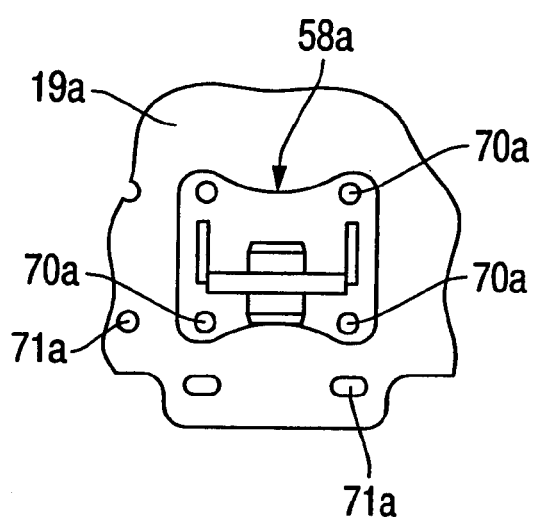
FIG. 19 shows, on a larger scale, a view of a receiving and supporting means of a spring device according to the detail E in FIG. 13.
Figure 20:
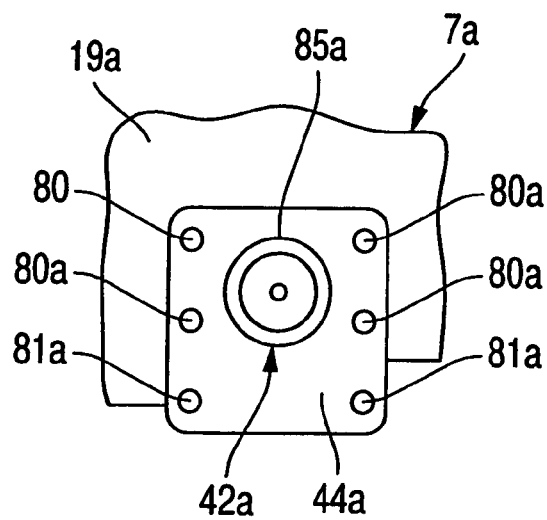
FIG. 20 shows, likewise on a larger scale, a view of the frame-side receiving and supporting means in the region of the axle serving as a carrying arm, according to detail F in FIG. 13.

According to FIGS. 13, 15 and 20, the intermediate pieces 44a have a plurality of bores 80a, and corresponding bores, which lie under the intermediate piece 44a in FIG. 20, are located in the side walls 18a and 19a of the vehicle frame 7a, so that the intermediate pieces 44a, together with their axles 42a, can be fastened to the side walls 18a and 19a of the vehicle frame 7a in an expedient way with the aid of screws, likewise not illustrated.

To achieve a different height setting of the axles 42a, additional bores 81a (FIG. 20) are located in the intermediate piece or intermediate pieces 44a. These additional bores 81a are not required in the case of a fastening of the intermediate pieces 44a in a first position according to FIGS. 13 and 20.

In order to arrange the axles 42a at another height level on the side walls 18a and 19a, the intermediate pieces 44a are fastened to the side walls 18a and 19a in a position rotated through 180°. The bores 81a, instead of the upper bores 80a according to FIG. 20, then lie at the top (not illustrated). The axle 42a thereby acquires a lower position, as may be gathered from a comparison of FIGS. 15 and 16 or as can also be seen from FIGS. 17 and 18. There, the axles 42a are located in each case at a different height level on the right side of the vehicle frame 7a than the axles 42a on its other side (merely for demonstration purposes).

It is consequently not only possible to vary the distance of the chassis carriers 10a and 11a from the vehicle frame 7 or 7a, but an arrangement of the chassis carriers 10 and 11 or 10a and 11a at a different height level can also be achieved both in the region of the axles 42a and in the region of the spring devices 41a.

A crawler-tracked vehicle according to the exemplary embodiments illustrated in the figures thus not only has the possibility of varying the track width (distance c according to FIG. 18), but the distance a (FIG. 14) of the axles 42a from the carrying and guiding brackets 58a of the spring device 41a can also be adjusted. Finally, the position or the height level of the axles 42a on the vehicle frame 7a can also be varied according to the distance b according to FIG. 17. The same applies to the height level of the carrying and guiding brackets 58a. The spacer bushes 45a and the spacer pieces 67a according to FIGS. 21 to 23 serve for varying the track width according to the distance c in FIG. 18. The distances a and b are achieved with the aid of bores additionally provided either in the side walls 18a and 19a or in the intermediate pieces 44a.

Figure 24:
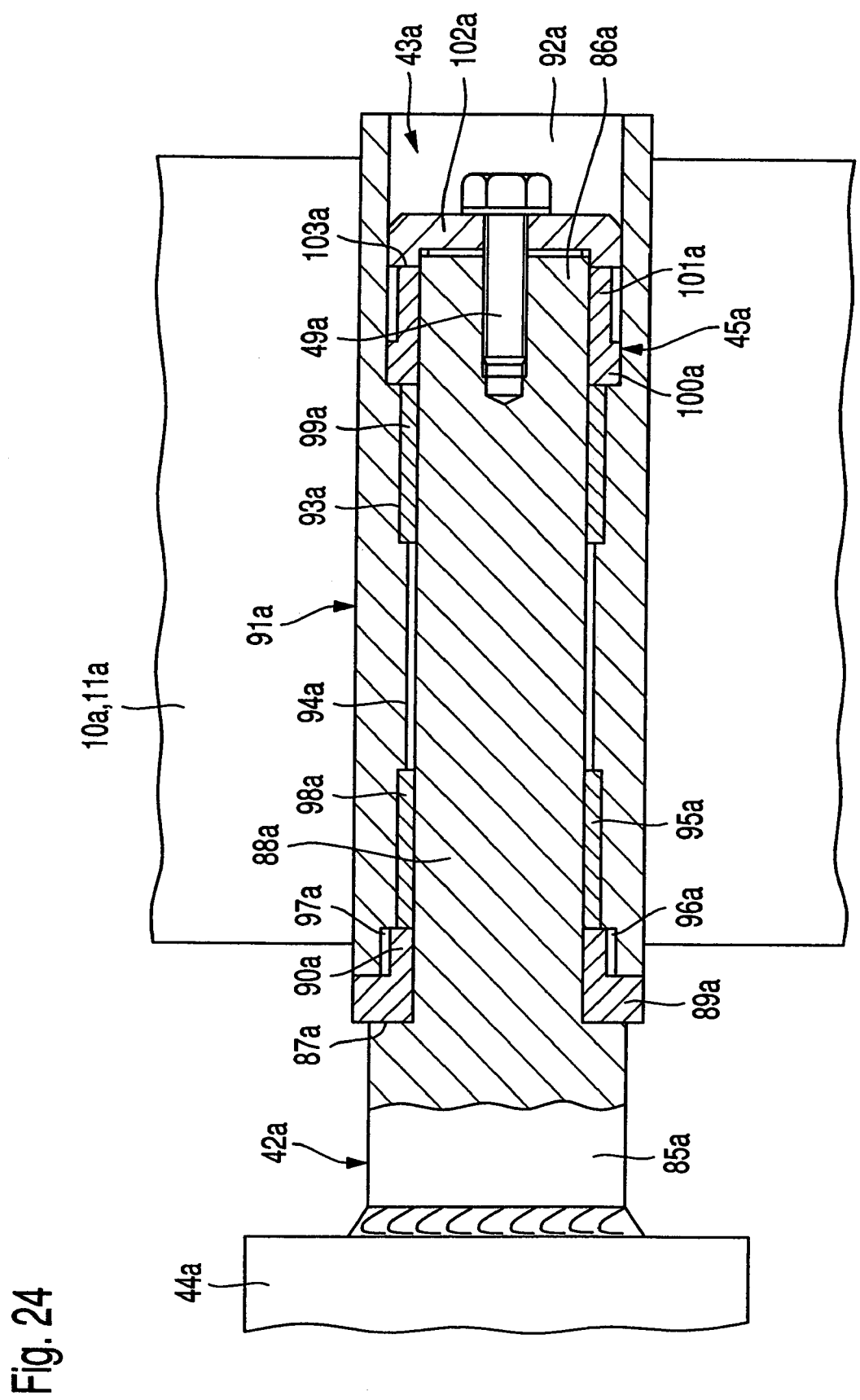
FIG. 24 shows, on a larger scale, a section through an axle serving as a carrying arm or as a pivot axle, with the position of the spacer bush in the case of a small track width.

The two FIGS. 24 and 25 show, partially in section, the axle 42a which serves as a carrying arm and as a pivot axle and which is welded, for example, to the intermediate piece 44a for fastening to the vehicle frame 7a (FIG. 13). The axle 42a has, in the region of its fastening point, an axle piece 85a serving as a stop and having a larger diameter than the rest of the axle 42a as far as its free end 86a. At a right-angled shoulder 87a, the axle piece 85a merges into the axle piece 88a having the smaller diameter. A sleeve 89a having the same diameter as the axle piece 88a bears axially against this shoulder 87a and engages with an annular projection 90a into a carrying sleeve 91a. In each case a carrying sleeve 91a is arranged in each chassis carrier 10a and 11a and has a bore 43a which is also illustrated in FIGS. 6 and 8.

According to the exemplary embodiment, the outer circumference of the carrying sleeve 91a is cylindrical, as illustrated in FIGS. 24 and 25.

The bore 43a in each of the carrying sleeves 91a is multiply shouldered. A first bore piece 92a of large diameter has adjoining it a bore piece 93a of smaller diameter and a middle bore piece 94a which then has a joining it, in the direction of the shoulder 87a, in turn, a bore piece 95a having the same diameter as the bore piece 93a and, finally, a relatively short bore piece 96a having the same inside diameter as the bore piece 92a.

The annular projection 90a of the sleeve 89a lies in the short bore piece 96a in the case of the small track width setting according to FIG. 24. Furthermore, in this case, an annular air gap 97a is located between the annular projection 90a and the inner contour of the short bore piece 96a.

The two bore pieces 93a and 95a serve for receiving in each case short bearing sleeves 98a and 99a in each case having a small material thickness.

The spacer bush 45a is located in the bore piece 92a in the case of the small track width setting. Said spacer bush is seated on the free end 86a of the axle 42a and, according to the exemplary embodiment, in a one-piece design, has an axially inner annular piece 100a of larger outside diameter and an annular piece 101a of somewhat smaller outside diameter. The disk-shaped pressure piece 51a (see also FIG. 12) bears with an annular end face 103a against the annular piece 101a on the end face.

By means of the fastening screw 49a (see also FIG. 12), the pressure piece 51a is held in a fastening position, so that the respective chassis carrier 10a or 11a is also connected securely and reliably to the vehicle frame 7a.

The spacer bush 45a may be in one piece or, as already stated above, consists of two half shells 46a, 47a (FIG. 11).

To vary the track width, the fastening screw 49a (FIG. 24) is released, whereupon the chassis carrier 10a, 11a is drawn off axially from the axle 42a until the spacer bush 45a can be removed. Thereupon, the spacer bush 45a, preferably consisting of two half shells, is placed onto the axle piece 88a of the axle 42a near to the axle piece 85a serving as a stop. This takes place in such a way that the annular piece 101a bears against the annular projection 90a of the sleeve 89a. The chassis carrier 10a, 11a is then pushed axially onto the axle 42a again, until the carrying sleeve 91a, with its short bore piece 96a, receives the annular piece 100a up to abutment against an end face 104a (FIG. 25). The fastening screw 49a is then also tightened, whereupon the chassis carrier 10a or 11a is fixed with a larger track width according to the axial length of the spacer bush 45a.

In the new position, the pressure disk 102a (see FIG. 25) holds the chassis carrier 10, 11a via the carrying sleeve 91a arranged axially immovably in the latter, since said pressure disk bears with its end face 103a against a shoulder 104a between the bore piece 92a and the bore piece 93a.

Axial forces are also transmitted via the bearing sleeves 98a and 99a.

The two short bearing sleeves 98a and 99a serve for achieving the desired pivoting movement between the chassis carriers 10a and 11a, on the one hand, and the vehicle frame 7a, on the other hand.

Finally, it goes without saying that many different modifications and developments of the inventions are possible, without departing from the basic inventive idea. Thus, for example, it is also possible, instead of the axle piece 85a with a diameter which is larger than that of the axle piece 88a, to provide a spacer bush 45a which may be single-shell or else double-shell and which can be shifted from a position near to the intermediate piece 44a into a position near to the free end 86a of the axle 42a. The invention is therefore not restricted to the exemplary embodiments illustrated in the figures and actually described in the description.

The invention claimed is:

1. A crawler-tracked vehicle with variable track width, being a construction vehicle (1) with at least one tool (3) and/or a vehicle for agricultural purposes, comprising at least one vehicle motor (4) and an overvehicle (5) having further components and an undervehicle (6) which comprises a vehicle frame (7), on which is provided on each of two sides a chassis (8, 9) with a chassis carrier (10, 11) respectively for at least one driving wheel (12, 13) and one deflecting wheel (14) and for supporting wheels (15) for crawler tracks (16, 17), wherein a distance of the crawler tracks (16, 17) from the vehicle frame (7) is variable, wherein at least one of the two chassis carriers (10, 11) can be fastened releasably to the vehicle frame (7) at a different distance transversely to the undervehicle (6) with carrying means (24, 25) arranged laterally at the front and rear and with receiving and supporting means (26, 27) and with holding and releasing means (28), and wherein at least one of the receiving and supporting means (27) arranged on the vehicle frame (7) is angular in cross section, and comprises a first leg (40') standing vertically, and a second leg (40") extending from an upper end (40''') of the first leg (40') horizontally in a direction toward a rear end (40) of the vehicle frame (7).

2. The crawler-tracked vehicle as a claimed in claim 1, wherein the carrying means (24,25), and the receiving and supporting means (26, 27), are respectively arranged on the chassis carrier (10, 11) and/or on the vehicle frame (7).

3. The crawler-tracked vehicle as claimed in claim 1, wherein the carrying means comprises a freely projecting carrying arm (24', 25').

4. The crawler-tracked vehicle as claimed in claim 3, wherein the carrying arm (24') is at least partially U-shaped in cross section.

5. The crawler-tracked vehicle as claimed in claim 3, wherein the carrying arm (25') is at least partially L-shaped in cross section.

6. The crawler-tracked vehicle as claimed in claim 1, wherein the receiving and supporting means (26, 27) are in each case receiving parts (26', 26", 27', 27") of U-shaped and/or L-shaped cross section.

7. The crawler-tracked vehicle as claimed in claim 4, wherein the carrying arms (24') of U-shaped cross section are arranged, with the cross section open downward, on the vehicle frame (7) and/or on the chassis carrier (10, 11).

8. A crawler-tracked vehicle with variable track width, being a construction vehicle (1) with at least one tool (3) and/or a vehicle for agricultural purposes, comprising at least one vehicle motor (4) and an overvehicle (5) having further components and an undervehicle (6) which comprises a vehicle frame (7), on which is provided on each of two sides a chassis (8, 9) with a chassis carrier (10, 11) respectively for at least one driving wheel (12, 13) and one deflecting wheel (14) and for supporting wheels (15) for crawler tracks (16, 17), wherein a distance of the crawler tracks (16, 17) from the vehicle frame (7) is variable, wherein at least one of the two chassis carriers (10, 11) can be fastened releasably to the vehicle frame (7) at a different distance transversely to the undervehicle (6) with carrying means (24, 25) arranged laterally at the front and rear and with receiving and supporting means (26, 27) and with holding and releasing means (28), wherein the carrying means (24, 25), and the receiving and supporting means (26, 27), are respectively arranged on the chassis carrier (10, 11) and/or on the vehicle frame (7), and wherein the receiving and supporting means (26, 27) comprise receiving parts (26', 26", 27', 27") projecting freely laterally from the vehicle frame (7) beyond side walls (18, 19) of the vehicle frame (7) and comprise profile parts (34, 35) extending in one piece through an interior (33) of the vehicle frame (7).

9. The crawler-tracked vehicle as claimed in claim 8, wherein at least one of the profile parts (35) has a passage orifice (39) directed into the interior (33) of the vehicle frame (7).

10. A crawler-tracked vehicle with variable track width, being a construction vehicle (1) with at least one tool (3) and/or a vehicle for agricultural purposes, comprising at least one vehicle motor (4) and an overvehicle (5) having further components and an undervehicle (6) which comprises a vehicle frame (7), on which is provided on each of two sides a chassis (8, 9) with a chassis carrier (10, 11) respectively for at least one driving wheel (12, 13) and one deflecting wheel (14) and for supporting wheels (15) for crawler tracks (16, 17), wherein a distance of the crawler tracks (16, 17) from the vehicle frame (7) is variable, wherein at least one of the two chassis carriers (10, 11) can be fastened releasably to the vehicle frame (7) at a different distance transversely to the undervehicle (6) with carrying means (24, 25) arranged laterally at the front and rear and with receiving and supporting means (26, 27) and with holding and releasing means (28), further comprising a drive (30, 31) for each crawler track (16, 17) arranged directly on the respective chassis carrier (10, 11).

11. The crawler-tracked vehicle as claimed in claim 10, wherein a carrying arm of round cross section, in the form of an axle (42a), and also at least one releasable spacer bush (45a) near one end of the vehicle frame (7a) and at least one spring device (41a) and a releasable spacer piece (67a) near another end of the vehicle frame (7a), respectively together with the holding a and releasing means, are provided on each vehicle side as the carrying means (24a) and as the receiving and supporting means (26a).

12. The crawlertracked vehicle as claimed in claim 11, wherein, for varying the track width, the spacer bush (45a) can be changed over freely on the axle (42a) from a position axially on the inside into a position axially on the outside.

13. The crawlertracked vehicle as claimed in claim 11, wherein the spacer bush consists of half shells (46a, 47a).

14. The crawler-tracked vehicle as claimed in claim 10, wherein the chassis carrier (10a, 11a) has indirectly or directly a bore (43a) for receiving an axle (42a), serving both as a carrying arm and as a pivot axle, and also fastening means.

15. The crawler-tracked vehicle as claimed in claim 11, wherein the spring device (41a) comprises at least one spring (56a, 57a) and, on the chassis side, a bracket (54a) and, on the frame side, a carrying and guiding bracket (58a) with which the spring device can be fastened to the vehicle frame (7a) and to the chassis carriers (10a, 11a) or with additionally at least one spacer piece (67a).

16. The crawler-tracked vehicle as claimed in claim 11, wherein, in the case of a small track width, the spacer bush (45a) is arranged on the axle (42a) axially on the outside at a free end (86a) of the axle.

17. The crawler-tracked vehicle as claimed in claim 16, wherein the spacer bush (45a) is arranged at least partially in the interior of a bore (43a) which receives the axle (42a) and which is located directly or indirectly in the chassis carrier (10a, 11a).

18. The crawler-tracked vehicle as claimed in claim 11, wherein, in the case of a large track width, the spacer bush (45a) is located on the frame side on the axle between an annular shoulder (87a) serving as an axle stop and the chassis carrier (10a, 11a).

19. The crawler-tracked vehicle as claimed in claim 18, wherein, in the case of the large track width, the spacer bush (45a) is arranged on the axle (42a) on the frame side and partially in a bore (43a), receiving the axle (42a), in the chassis carrier (10a, 11a).

\* \* \* \* \*

UNITED STATES PATENT AND TRADEMARK OFFICE
CERTIFICATE OF CORRECTION

PATENT NO. : 7,373,999 B2
APPLICATION NO. : 10/825079
DATED : May 20, 2008
INVENTOR(S) : Haringer Page 1 of 1

It is certified that error appears in the above-identified patent and that said Letters Patent is hereby corrected as shown below:

Title page,
Item [30], Foreign Application Priority Data,
add --Mar. 18, 2004 (EP) ............ 04006506--;

Column 2,
Line 52, after "perspective", insert --view--;

Column 9,
Line 18, after "as", delete "a";

Column 10,
Line 26, after "holding", delete "a";
Lines 29 and 33, after "The", replace "crawlertracked" by --crawler-tracked--;

Signed and Sealed this

Twenty-seventh Day of October, 2009

David J. Kappos
*Director of the United States Patent and Trademark Office*